(12) United States Patent
Feher

(10) Patent No.: US 11,448,129 B2
(45) Date of Patent: Sep. 20, 2022

(54) INLET AIR HEATING SYSTEM FOR A GAS TURBINE SYSTEM

(71) Applicant: General Electric Company, Schenectady, NY (US)

(72) Inventor: Peter Feher, Suwanee, GA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/114,879

(22) Filed: Dec. 8, 2020

(65) Prior Publication Data

US 2022/0178303 A1    Jun. 9, 2022

(51) Int. Cl.
    *F02C 7/08* (2006.01)
    *F02C 6/18* (2006.01)

(52) U.S. Cl.
    CPC .............. *F02C 7/08* (2013.01); *F02C 6/18* (2013.01); *F05D 2220/3217* (2013.01)

(58) Field of Classification Search
    CPC ....... F02C 7/08; F02C 6/18; F05D 2220/3217
    See application file for complete search history.

(56) References Cited

U.S. PATENT DOCUMENTS

| | | | |
|---|---|---|---|
| 8,356,466 B2 | 1/2013 | Motakef et al. | |
| 8,468,830 B2 | 6/2013 | Motakef et al. | |
| 8,483,929 B2 | 7/2013 | DiAntonio et al. | |
| 2005/0223728 A1* | 10/2005 | Stuhlmueller | F02C 6/18 62/238.3 |
| 2010/0101209 A1* | 4/2010 | Feher | F02C 6/08 60/266 |
| 2010/0146930 A1* | 6/2010 | Motakef | F02C 7/047 60/39.182 |
| 2012/0317988 A1* | 12/2012 | Gardiner | F02C 6/18 60/39.182 |
| 2013/0199196 A1 | 8/2013 | Chillar et al. | |

(Continued)

FOREIGN PATENT DOCUMENTS

| | | |
|---|---|---|
| EP | 2180165 A2 | 4/2010 |
| EP | 2626535 | 8/2013 |
| EP | 2881562 | 6/2015 |

OTHER PUBLICATIONS

"Hybrid Combustion Air Conditioning", A New Method to Optimise the Operation of Gas Turbines, Thermo Integral, Innovative Solutions in the Service of Humans and the Environment, 8 pgs.

(Continued)

*Primary Examiner* — Shafiq Mian
(74) *Attorney, Agent, or Firm* — Fletcher Yoder, P.C.

(57) ABSTRACT

An inlet air heating system for a gas turbine system includes an inlet heat exchanger configured to be positioned upstream of a compressor of the gas turbine system. The inlet air heating system also includes a heating loop fluidly coupled to the inlet heat exchanger. The heating loop is configured to provide heating fluid to the inlet heat exchanger, and the inlet heat exchanger is configured to facilitate transfer of heat from the heating fluid to an airflow into the compressor. Furthermore, the inlet air heating system includes a heat transfer assembly configured to receive cooling tower fluid from a fluid pathway extending between a steam condenser and a cooling tower. The heat transfer assembly is configured to facilitate transfer of heat from the cooling tower fluid to the heating fluid.

20 Claims, 4 Drawing Sheets

(56) References Cited

U.S. PATENT DOCUMENTS

2016/0040596 A1* 2/2016 Klosinski .................. F02C 9/18
                                                    60/785
2017/0350320 A1* 12/2017 Kippel .................... F01D 25/12

OTHER PUBLICATIONS

"Gas Turbine Air Inlet Pre-heating for Part Load Efficiency (PLE)", GEK121696, 2019, 23 pgs.
EP Application No. 21212059.6, Extended European Search Report, dated Apr. 21, 2022, 9 pgs.

* cited by examiner

INLET AIR HEATING SYSTEM FOR A GAS TURBINE SYSTEM

BACKGROUND

The subject matter disclosed herein relates to an inlet air heating system for a gas turbine system.

Gas turbine systems typically include at least one gas turbine engine having a compressor, a combustor, a turbine, and fuel source(s). Certain gas turbine systems have an inlet air heating system configured to increase the temperature of air flowing into the compressor. The inlet air heating system may be activated during certain operational conditions (e.g., lower operating capacity of the gas turbine system) and/or ambient air conditions (e.g., lower ambient air temperatures) to increase the efficiency of the gas turbine system. Certain inlet air heating systems are configured to facilitate transfer of heat from condensate, which comes from a lower pressure economizer, to the ambient air, thereby increasing the temperature of the ambient air. Unfortunately, transferring heat from the condensate to the ambient air reduces the heat/energy within the fluid that ultimately drives a steam turbine of a steam turbine system, thereby reducing the output of the steam turbine system.

BRIEF DESCRIPTION

Certain embodiments commensurate in scope with the original claims are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In accordance with an embodiment of the present disclosure, an inlet air heating system for a gas turbine system includes an inlet heat exchanger configured to be positioned upstream of a compressor of the gas turbine system. The inlet air heating system also includes a heating loop fluidly coupled to the inlet heat exchanger. The heating loop is configured to provide heating fluid to the inlet heat exchanger, and the inlet heat exchanger is configured to facilitate transfer of heat from the heating fluid to an airflow into the compressor. Furthermore, the inlet air heating system includes a heat transfer assembly configured to receive cooling tower fluid from a fluid pathway extending between a steam condenser and a cooling tower. The heat transfer assembly is configured to facilitate transfer of heat from the cooling tower fluid to the heating fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In certain embodiments, an inlet air heating system for a gas turbine system includes an inlet heat exchanger configured to be positioned upstream of a compressor of the gas turbine system. In addition, the inlet air heating system includes a heating loop fluidly coupled to the inlet heat exchanger. The heating loop is configured to provide heating fluid to the inlet heat exchanger, and the inlet heat exchanger is configured to facilitate transfer of heat from the heating fluid to an airflow into the compressor. The inlet air heating system also includes a heat transfer assembly (e.g., including a heat exchanger) configured to receive cooling tower fluid from a fluid pathway extending between a steam condenser and a cooling tower. The heat transfer assembly is configured to facilitate transfer of heat from the cooling tower fluid to the heating fluid. Because the inlet air heating system uses heat from the cooling tower fluid to heat the airflow to the compressor, heat within a steam turbine system, which is configured to utilize combustion gases from the gas turbine system to generate steam for driving rotation of a steam turbine, may be increased, as compared to utilizing an inlet air heating system that only uses heat from the steam turbine system to heat the airflow to the compressor. As a result, energy transfer to the load/generator coupled to the steam turbine may be increased, thereby increasing the output of the steam turbine system.

Figure 1:
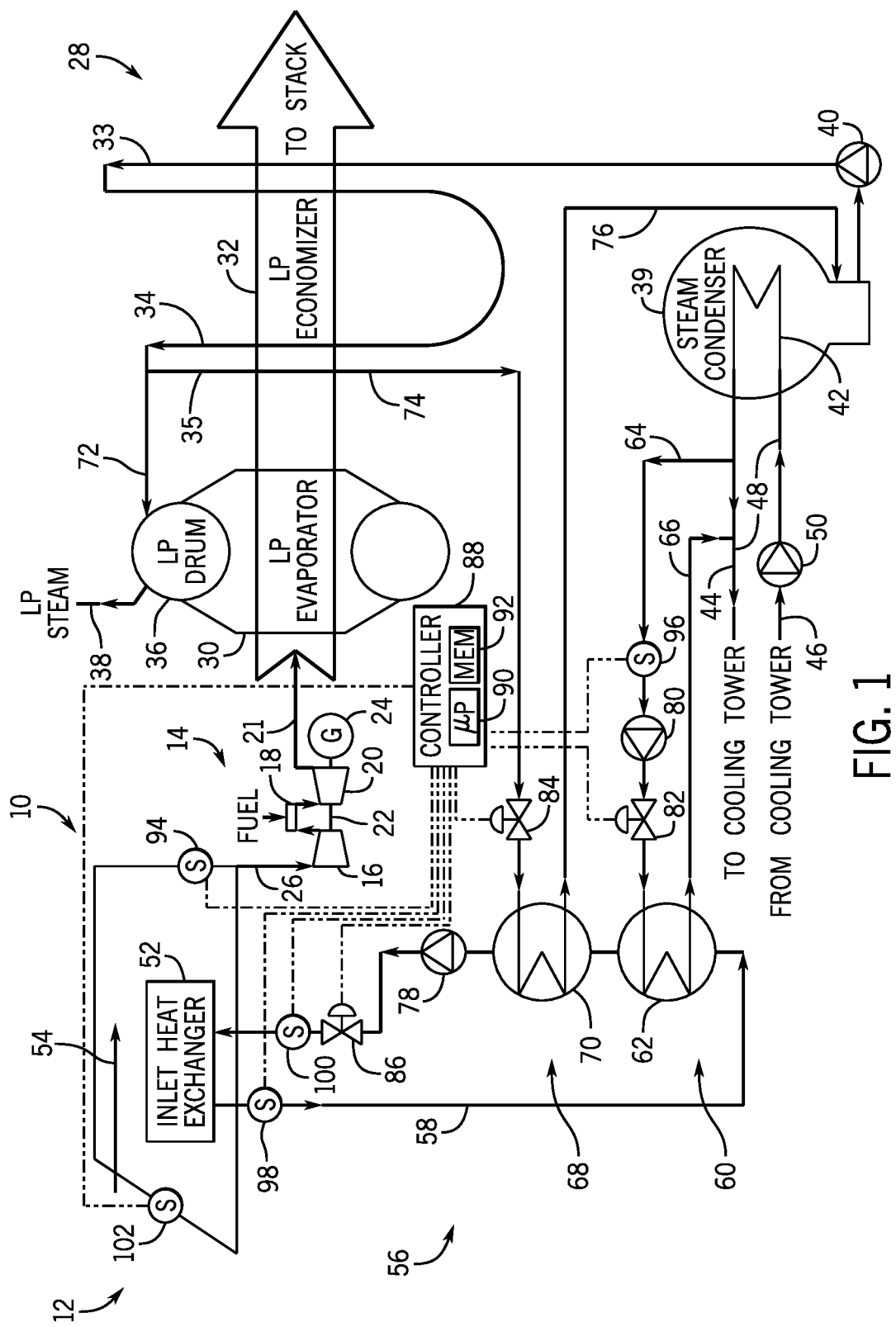
FIG. 1 is a block diagram of an embodiment of a gas turbine system having an embodiment of an inlet air heating system, in accordance with an aspect of the present disclosure.

Turning now to the drawings, FIG. 1 is a block diagram of an embodiment of a gas turbine system 10 having an embodiment of an inlet air heating system 12. In the illustrated embodiment, the gas turbine system 10 includes a gas turbine engine 14, and the gas turbine engine 14 includes a compressor 16, a combustor 18, and a turbine 20. As illustrated, the combustor 16 receives compressed air from the compressor 16 and fuel from a fuel source. The fuel source may supply a liquid fuel and/or a gaseous fuel, such as natural gas and/or syngas generated from a gasification system (e.g., a gasifier that produces syngas from a feedstock, such as coal). The combustor 18 ignites and combusts the fuel with the compressed air from the compressor 16, thereby producing hot pressurized combustion gases (e.g., exhaust) 21.

Turbine blades within the turbine 20 are coupled to a shaft 22 of the gas turbine engine 14, which may also be coupled to several other components throughout the gas turbine system 10. As the combustion gases 21 flow against and between the turbine blades of the turbine 20, the turbine blades are driven in rotation, which causes the shaft 22 to rotate. Eventually, the combustion gases 21 exit the gas turbine engine 14 via an exhaust outlet. Further, in the illustrated embodiment, the shaft 22 is coupled to a load 24, which is powered via the rotation of the shaft 22. The load 24 may be any suitable device that generates power via the rotational output of the gas turbine engine 14, such as an electrical generator or other load.

The compressor 16 of the gas turbine engine 14 includes compressor blades. The compressor blades within the compressor 16 are coupled to the shaft 22 and rotate as the shaft 22 is driven to rotate by the turbine 20, as discussed above. As the compressor blades rotate within the compressor 16, the compressor 16 compresses air 26 received from an air intake to produce pressurized air. The pressurized air is then fed into the combustor 18. The pressurized air and the fuel flow into the combustor 18 for combustion to drive rotation of the turbine 20.

In the illustrated embodiment, the combustion gases 21 are directed to a steam turbine system 28. The steam turbine system 28 is configured to facilitate transfer of heat from the combustion gases 21 to water, thereby generating steam that is used to drive rotation of a steam turbine. The steam turbine may be coupled to a load, such as a generator, and the rotational energy of the steam turbine may be transferred to the load (e.g., to facilitate generation of electrical power). In the illustrated embodiment, the steam turbine system 28 includes a low pressure (LP) evaporator 30 and an LP economizer 32. The LP evaporator 30 and the LP economizer 32 are configured to facilitate transfer of heat from the combustion gases 21 to feed water.

As illustrated, lower-temperature feed water 33 flows into the LP economizer 32, which increases the temperature of the feed water, thereby generating higher-temperature feed water 34. The higher-temperature feed water 34 then flows into the LP evaporator 30 via an LP drum 36. Heat from the combustion gases 21 is transferred to the higher-temperature feed water 34, thereby generating LP steam 38. The LP steam 38 flows to an LP steam turbine and drives the LP steam turbine to rotate. The LP steam turbine may be coupled to a load, such as a generator, and the rotation energy of the LP steam turbine may be transferred to the load (e.g., to facilitate generation of electrical power).

In the illustrated embodiment, the LP evaporator 30 is positioned upstream of the LP economizer 32 relative to the flow of the combustion gases 21. Accordingly, the feed water within the LP evaporator 30 may be exposed to higher combustion gas temperatures than the feed water within the LP economizer 32. While the LP evaporator 30 and the LP economizer 32 are in the flow path of the combustion gases 21 in the illustrated embodiment, in other embodiments, the LP economizer 32 may be omitted, and/or additional heat exchangers (e.g., a high pressure evaporator, an intermediate pressure evaporator, etc.) may be positioned within the flow path of the combustion gases 21.

In the illustrated embodiment, the lower-temperature feed water 33 is provided by a steam condenser 39. Accordingly, the lower-temperature feed water 33 includes condensate from the steam condenser 39. In the illustrated embodiment, a pump 40 drives the lower-temperature feed water/condensate to flow from the steam condenser 39 to the LP economizer 32. Furthermore, the steam condenser 39 receives a flow of higher-temperature feed water 34 from the LP economizer 32. As illustrated, a first portion of the higher-temperature feed water 34 flows from the LP economizer 32 to the LP drum 36, and a second portion 35 of the higher-temperature feed water 34 flows to the steam condenser 39. The steam condenser 39 may also receive steam and/or higher-temperature water from other sources, such as the LP steam turbine, the LP drum, an intermediate pressure steam turbine, a high pressure steam turbine, other suitable source(s), or a combination thereof. The steam condenser 39 is configured to condense received steam to condensate (e.g., water) and to reduce the temperature of the condensate and/or received higher-temperature water. In the illustrated embodiment, the steam condenser 39 includes a heat exchanger 42 configured to transfer heat from the received steam/higher-temperature water to cooling tower fluid (e.g., water).

As illustrated, a first fluid pathway 44 extends between the steam condenser 39 and a cooling tower (not shown) in a direction away from the steam condenser 39. In addition, a second fluid pathway 46 extends between the cooling tower and the steam condenser 39 in a direction toward the steam condenser 39. Cooling tower fluid (e.g., water) 48 flows through the second fluid pathway 46 from the cooling tower to the steam condenser 39, and heated cooling tower fluid 48 flows through the first fluid pathway 44 from the steam condenser 39 to the cooling tower. In the illustrated embodiment, a pump 50 disposed along the second fluid pathway 46 drives the cooling tower fluid 48 to flow from the cooling tower to the steam condenser 39.

Within the steam condenser 39, the heat exchanger 42 facilitates transfer of heat from the steam/higher-temperature water to the cooling tower fluid, thereby condensing the steam into the condensate, reducing the temperature of the higher-temperature water, and increasing the temperature of the cooling tower fluid 48. After receiving the heat from the steam/higher-temperature water, the heated cooling tower fluid 48 flows to the cooling tower via the first fluid pathway 44. The cooling tower facilitates transfer of heat from the heated cooling tower fluid 48 to the environment, thereby generating the cooling tower fluid 48 that flows through the second fluid pathway 46 to the steam condenser 39.

In the illustrated embodiment, the gas turbine system 10 includes an inlet air heating system 12 configured to increase the temperature of the airflow into the compressor 16. The inlet air heating system 12 may be activated/utilized during certain operational conditions and/or ambient air conditions to increase the efficiency of the gas turbine system 10. For example, while the gas turbine system 10 is operating at a lower capacity in lower ambient air temperatures, the inlet air heating system 12 may be activated/utilized to increase the temperature of the airflow into the compressor 16, thereby increasing the operating efficiency of the gas turbine system 10.

In the illustrated embodiment, the inlet air heating system 12 includes an inlet heat exchanger 52 positioned upstream of the compressor 16 along an airflow path 54 from the ambient environment to the compressor 16. The inlet heat exchanger 52 is configured to receive ambient air and to transfer heat to the air, thereby establishing a heated airflow 26 into the compressor 16. In addition, the inlet air heating system 12 includes a heating loop 56 fluidly coupled to the inlet heat exchanger 52. The heating loop 56 is configured to provide heating fluid 58 (e.g., water, a water/propylene glycol solution, a water/ethylene glycol solution, etc.) to the inlet heat exchanger 52, and the inlet heat exchanger 52 is configured to facilitate transfer of heat from the heating fluid 58 to the airflow into the compressor 16. In the illustrated embodiment, the inlet air heating system 12 includes a heat transfer assembly 60 (e.g., first heat transfer assembly 60) configured to receive heated cooling tower fluid (e.g., water) 48 from the first fluid pathway 44 extending from the steam condenser 39 to the cooling tower. The heat transfer assembly 60 is configured to facilitate transfer of heat from the cooling tower fluid 48 to the heating fluid 58.

In the illustrated embodiment, the heat transfer assembly 60 includes a heating loop heat exchanger 62 configured to facilitate transfer of heat from the heated cooling tower fluid 48 to the heating fluid 58. As illustrated, a first portion of the heated cooling tower fluid (e.g., water) 48 flows from the steam condenser 39 to the cooling tower via the first fluid pathway 44, and a second portion of the heated cooling tower fluid (e.g., water) 48 flows from the steam condenser 39 to the heating loop heat exchanger 62 via the first fluid pathway 44 and a first fluid passage 64. Within the heating loop heat exchanger 62, heat is transferred from the heated cooling tower fluid 48 to the heating fluid 58, thereby increasing the temperature of the heating fluid 58 and reducing the temperature of the cooling tower fluid 48. The lower-temperature cooling tower fluid 48 returns to the first fluid pathway 44 via a second fluid passage 66. The cooling tower fluid 48 then mixes with the first portion of the cooling tower fluid 48 and flows to the cooling tower.

In addition, the heated heating fluid 58 flows from the heating loop heat exchanger 62 to the inlet heat exchanger 52, where heat is transferred from the heating fluid 58 to the airflow into the compressor 16. The transfer of heat from the heating fluid 58 to the airflow reduces the temperature of the heating fluid 58, and the lower-temperature heating fluid 58 flows back to the heating loop heat exchanger 62. Because the inlet air heating system 12 uses heat from the cooling tower fluid 48 to heat the airflow to the compressor 16, heat within the steam turbine system 28 may be increased, as compared to utilizing an inlet air heating system that only uses heat from the steam turbine system 28 (e.g., heat from the higher-temperature feed water) to heat the airflow to the compressor 16. As a result, energy transfer to the load/generator coupled to the steam turbine may be increased, thereby increasing the output of the steam turbine system 28.

In the illustrated embodiment, the inlet air heating system 12 includes a second heat transfer assembly 68 configured to receive the higher-temperature feed water 35 (e.g., condensate) from the LP economizer 32. The second heat transfer assembly 68 is configured to facilitate heat transfer from the higher-temperature feed water 35 to the heating fluid 58 within the heating loop 56. For example, in certain operating conditions and/or environmental conditions, the first heat transfer assembly 60 may not provide sufficient heat to the heating fluid 58. Accordingly, the second heat transfer assembly 68 may be utilized (e.g., in conjunction with the first heat transfer assembly 60) to provide sufficient heat to the heating fluid 58 to effectively heat the airflow 26 to the compressor 16.

In the illustrated embodiment, the second heat transfer assembly 68 includes a second heating loop heat exchanger 70 configured to facilitate transfer of heat from the higher-temperature feed water 35 (e.g., condensate) to the heating fluid 58. As illustrated, the second heating loop heat exchanger 70 is positioned along the flow path of the higher-temperature feed water 35 from the LP economizer 32 to the steam condenser 39. In the illustrated embodiment, a first LP flow passage 72 fluidly couples the LP economizer 32 to the LP drum 36, and a second LP flow passage 74 fluidly couples the first LP flow passage 72 to the second heating loop heat exchanger 70. Accordingly, the higher-temperature feed water 35 flows through the second LP flow passage 74 from the first LP flow passage 72 to the second heating loop heat exchanger 70. Furthermore, a third LP flow passage 76 fluidly couples the second heating loop heat exchanger 70 to the steam condenser 39. Accordingly, the higher-temperature feed water 35 flows from the second heating loop heat exchanger 70 to the steam condenser 39. Within the second heating loop heat exchanger 70, heat is transferred from the higher-temperature feed water 35 to the heating fluid 58. While the inlet air heating system 12 includes the second heat transfer assembly 68 in the illustrated embodiment, in other embodiments, the second heat transfer assembly 68 may be omitted. Furthermore, in certain embodiments, another suitable heat transfer assembly, which may receive heat from another suitable source (e.g., feed water for a high pressure evaporator, feed water for an intermediate pressure evaporator, etc.), may be utilized to heat the heating fluid 58.

In the illustrated embodiment, the inlet air heating system 12 includes a heating loop pump 78 disposed along the heating loop 56. The heating loop pump 78 is configured to drive the heating fluid 58 around the heating loop 56, thereby facilitating heat transfer from the first heat transfer assembly 60 and/or the second heat transfer assembly 68 to the inlet heat exchanger 52. While the inlet air heating system 12 includes a single heating loop pump in the illustrated embodiment, in other embodiments, the inlet air heating system 12 may include more or fewer heating loop pumps (e.g., 0, 2, 3, 4, or more). For example, in certain embodiments, the heating loop pump 78 may be omitted.

Furthermore, in the illustrated embodiment, the inlet air heating system 12 includes a heat transfer assembly pump 80 disposed along the first fluid passage 64. The heat transfer assembly pump 80 is configured to drive the heated cooling tower fluid 48 (e.g., water) through the first heat transfer assembly 60, thereby facilitating heat transfer from the heated cooling tower fluid 48 to the heating fluid 58. While the inlet air heating system 12 includes a single heat transfer assembly pump in the illustrated embodiment, in other embodiments, the inlet air heating system may include additional heating loop pumps (e.g., an additional 1, 2, 3, 4, or more pumps). Furthermore, while the heat transfer assembly pump 80 is disposed along the first fluid passage 64 in the illustrated embodiment, in other embodiments, the heat transfer assembly pump 80 may be disposed along the second fluid passage 66, or one or more heat transfer assembly pumps may be disposed along the first fluid passage 64 and/or along the second fluid passage 66.

In the illustrated embodiment, the inlet air heating system 12 includes a first valve 82 configured to control a flow rate of the heated cooling tower fluid 48 through the first heat transfer assembly 60. As illustrated, the first valve 82 is disposed along the first fluid passage 64. In addition, the inlet air heating system 12 includes a second valve 84 configured to control a flow rate of the higher-temperature feed water 35 (e.g., condensate) through the second heat transfer assembly 68. In the illustrated embodiment, the second valve 84 is disposed along the second LP flow passage 74. Furthermore, the inlet air heating system 12 includes a third valve 86 configured to control a flow rate of the heating fluid 58 through the heating loop 56. As illustrated, the third valve 86 is disposed along the heating loop 56.

While the first valve 82 is positioned along the first fluid passage 64 in the illustrated embodiment, in other embodiments, the first valve 82 may be positioned at any other suitable location to facilitate control of the flow rate of the heated cooling tower fluid 48 through the first heat transfer assembly 60, such as along the second fluid passage 66. Furthermore, while the second valve 84 is disposed along the second LP flow passage 74 in the illustrated embodiment, in other embodiments, the second valve 84 may be positioned at any other suitable location to facilitate control of the flow rate of the higher-temperature feed water 35 through the second heat transfer assembly 68, such as along the third LP flow passage 76.

In the illustrated embodiment, the first valve 82, the second valve 84, and the third valve 86 are communicatively coupled to a controller 88, which is configured to control the positions of the valves. In certain embodiments, the controller 88 is an electronic controller having electrical circuitry configured to control the first valve 82, the second valve 84, and the third valve 86. In the illustrated embodiment, the controller 88 includes a processor, such as the illustrated microprocessor 90, and a memory device 92. The controller 88 may also include one or more storage devices and/or other suitable components.

The processor 90 may be used to execute software, such as software for controlling the first valve 82, the second valve 84, the third valve 86, and so forth. Moreover, the processor 90 may include multiple microprocessors, one or more "general-purpose" microprocessors, one or more special-purpose microprocessors, and/or one or more application specific integrated circuits (ASICs), or some combination thereof. For example, the processor 90 may include one or more reduced instruction set (RISC) processors.

The memory device 92 may include a volatile memory, such as random access memory (RAM), and/or a nonvolatile memory, such as read-only memory (ROM). The memory device 92 may store a variety of information and may be used for various purposes. For example, the memory device 92 may store processor-executable instructions (e.g., firmware or software) for the processor 90 to execute, such as instructions for controlling the valves, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the valves, etc.), and any other suitable data.

In certain embodiments, the controller 88 is configured to control the first valve 82 to establish a target temperature of the airflow 26 into the compressor 16. In the illustrated embodiment, a first temperature sensor 94 is positioned along the airflow path 54 to the compressor 16 and communicatively coupled to the controller 88. The first temperature sensor 94 is configured to output a first sensor signal indicative of the temperature of the airflow 26 downstream from the inlet heat exchanger 52 (e.g., into the compressor 16). In certain embodiments, the controller 88 is configured to control the position of the first valve 82 (e.g., between an open position and a closed position) to control the flow rate of the heated cooling tower fluid 48 through the first heat transfer assembly 60, thereby controlling the temperature of the heating fluid 58. Because heat is transferred from the heating fluid 58 to the airflow to the compressor 16 via the inlet heat exchanger 52, controlling the temperature of the heating fluid 58 controls the temperature of the airflow 26 into the compressor 16. Accordingly, the controller 88 may control the position of the first valve 82 to control the temperature of the airflow 26 into the compressor 16. In certain operating conditions, the second valve 84 may be closed while the controller 88 is controlling the position of the first valve 82 to control the temperature of the airflow 26 into the compressor 16.

Furthermore, in certain embodiments, the controller is configured to enable opening of the second valve 84 in response to determining that a position of the first valve 82 is greater than or equal to a threshold position for more than a first threshold duration. For example, the threshold position may be 50 percent open, 60 percent open, 70 percent open, 80 percent open, 90 percent open, or 95 percent open, among other suitable positions. Furthermore, the first threshold duration may be 15 seconds, 30 seconds, 45 seconds, 60 seconds, 75 seconds, or 90 seconds, among other suitable durations. While opening of the second valve 84 is enabled, the controller 88 is configured to control the second valve 84 to establish the target temperature of the airflow 26 into the compressor 16.

For example, as the first valve 82 approaches the fully open position, heat transfer between the heated cooling tower fluid 48 and the heating fluid 58 at the first heater transfer assembly 60 approaches a maximum. In operating and/or environmental conditions when the first heat transfer assembly 60 is providing the maximum heat transfer and the ambient temperature drops, the heating fluid 58 may not provide sufficient heat to the inlet heat exchanger 52 to maintain the target temperature of the airflow 26 into the compressor 16. Accordingly, as the first valve 82 approaches the fully open position, the controller 88 enables opening of the second valve 84, thereby enabling the controller 88 to control the second valve 84 to establish the target temperature of the airflow 26 into the compressor 16. With the second valve 84 open, the higher-temperature feed water 35 (e.g., condensate) flows through the second heat transfer assembly 68, thereby increasing the temperature of the heating fluid 58. As a result, the heating fluid 58 may provide sufficient heat to the inlet heat exchanger 52 to substantially maintain the target temperature of the airflow 26 to the compressor 16 (e.g., while the first valve 82 is in the fully open position).

Furthermore, in certain embodiments, the controller 88 is configured to instruct the second valve 84 to close and to disable opening of the second valve 84 in response to determining that the position of the first valve 82 is less than the threshold position for more than a second threshold duration. The second threshold duration may be 15 seconds, 30 seconds, 45 seconds, 60 seconds, 75 seconds, or 90 seconds, among other suitable durations.

Because the second valve 84 is only enabled to open in response to the first valve 82 approaching the fully open position, heat transfer from the heated cooling tower fluid (e.g., water) 48 to the heating fluid 58 is prioritized over heat transfer from the higher-temperature feed water 35 (e.g., condensate) to the heating fluid 58. Accordingly, heat is only transferred from the higher-temperature feed water 35 to the heating fluid 58 when the heat provided by the heated cooling tower fluid 48 is insufficient or nearly insufficient to maintain the airflow 26 into the compressor 16 at the target temperature. As a result, heat loss within the steam turbine system 28 may be substantially reduced, as compared to utilizing an inlet air heating system that only uses heat from the steam turbine system 28 (e.g., heat from the higher-temperature feed water) to heat the airflow to the compressor 16. As a result, energy transfer to the load/generator coupled to the respective steam turbine may be increased, thereby increasing the output of the steam turbine system 28.

In certain embodiments, the controller 88 is configured to determine a temperature difference (e.g., first temperature difference) between the heated cooling tower fluid (e.g., water) 48 flowing into the first heat transfer assembly 60 and the heating fluid 58 flowing from the inlet heat exchanger 52. In the illustrated embodiment, a second temperature sensor 96 is positioned along the first fluid passage 64 upstream of the first heat transfer assembly 60, and a third temperature sensor 98 is positioned along the heating loop 56 downstream (e.g., immediately downstream) from the inlet heat exchanger 52. As illustrated, the second and third temperature sensors 96, 98 are communicatively coupled to the controller 88.

The second temperature sensor 96 is configured to output a second sensor signal indicative of the temperature of the heated cooling tower fluid 48 flowing into the first heat transfer assembly 60, and the third temperature sensor 98 is configured to output a third sensor signal indicative of the temperature of the heating fluid 58 flowing from the inlet heat exchanger 52. The controller 88 is configured to determine the temperature difference between the heated cooling tower fluid (e.g., water) 48 flowing into the first heat transfer assembly 60 and the heating fluid 58 flowing from the inlet heat exchanger 52 based on the second and third sensor signals.

In certain embodiments, the controller 88 is configured to instruct the first valve 82 to close while opening of the second valve 84 is enabled and in response to determining that the temperature difference between the heated cooling tower fluid (e.g., water) 48 flowing into the first heat transfer assembly 60 and the heating fluid 58 flowing from the inlet heat exchanger 52 is less than or equal to a threshold temperature difference for more than a third threshold duration. For example, the threshold temperature difference may be 0.25 degrees Fahrenheit, 0.5 degrees Fahrenheit, 0.75 degrees Fahrenheit, or 1.0 degrees Fahrenheit, among other suitable temperature differences. Furthermore, the third threshold duration may be 15 seconds, 30 seconds, 45 seconds, 60 seconds, 75 seconds, or 90 seconds, among other suitable durations. The controller 88 is configured to instruct the first valve 82 to close under the conditions disclosed above because the first heat transfer assembly 60 is providing a substantially insignificant amount of heat to the heating fluid 58 during such conditions. While control of the valves is based on the first, second, and third threshold durations in the embodiment disclosed above, in other embodiments, at least one valve control action may be performed substantially instantaneously in response to a detected condition/parameter/value.

In certain embodiments, the controller 88 is configured to determine a second temperature difference between a temperature of the heating fluid 58 flowing into the inlet heat exchanger 52 and the temperature of the heating fluid 58 flowing out of the inlet heat exchanger 52. In the illustrated embodiment, a fourth temperature sensor 100 is positioned along the heating loop 56 upstream (e.g., immediately upstream) of the inlet heat exchanger 52. As illustrated, the fourth temperature sensor 100 is communicatively coupled to the controller 88. In addition, the fourth temperature sensor 100 is configured to output a fourth sensor signal indicative of the temperature of the heating fluid 58 flowing into the inlet heat exchanger 52. The controller 88 is configured to determine the second temperature difference between the heating fluid 58 flowing into the inlet heat exchanger 52 and the heating fluid 58 flowing from the inlet heat exchanger 52 based on the third sensor signal from the third temperature sensor 98 and the fourth sensor signal from the fourth temperature sensor 100.

Furthermore, in certain embodiments, the controller 88 is configured to determine a third temperature difference between a target temperature of the airflow 26 into the compressor 16 and the temperature of the airflow into the inlet heat exchanger 52. In the illustrated embodiment, a fifth temperature sensor 102 is positioned upstream of the inlet heat exchanger 52 along the airflow path 54 from the ambient environment to the compressor 16. As illustrated, the fifth temperature sensor 102 is communicatively coupled to the controller 88. In addition, the fifth temperature sensor 102 is configured to output a fifth sensor signal indicative of the temperature of the airflow into the inlet heat exchanger 52. The controller 88 is configured to determine the third temperature difference between the target temperature of the airflow 26 into the compressor 16 and the temperature of the airflow into the inlet heat exchanger 52 based on the fifth sensor signal and the target temperature of the airflow 26 into the compressor 16. The target temperature may be determined by the controller 88, received from a remote electronic device, received from a user interface, or a combination thereof.

In certain embodiments, the controller 88 is configured to control the third valve 86 such that the second temperature difference is less than the third temperature difference multiplied by a first adjustment factor and is greater than or equal to the third temperature difference multiplied by a second adjustment factor. The first adjustment factor is greater than the second adjustment factor. For example, the first adjustment factor may be 1.0, and the second adjustment factor may be 0.9. However, in other embodiments, the first adjustment factor may be greater or less than 1.0 (but still greater than the second adjustment factor), and/or the second adjustment factor may be greater or less than 0.9 (but still less than the first adjustment factor). Controlling the third valve 86 in the manner disclosed above establishes substantially equal heat capacity rates (e.g., the product of the mass flow rate and the specific heat) of the airflow through the inlet heat exchanger 52 and the heating fluid flow through the inlet heat exchanger 52, thereby increasing the efficiency of the inlet air heating system 12.

While the inlet air heating system 12 includes three controlled valves in the illustrated embodiment, in other embodiments, the inlet air heating system 12 may include more or fewer controlled valves configured to control respective fluid flow(s). Furthermore, while the higher-temperature feed water 35 (e.g., heated fluid) from the LP economizer 32 is provided to the second heat transfer assembly 68 in the illustrated embodiment, in other embodiments, the second heat transfer assembly 68 may receive heated fluid from another suitable source steam turbine system 28, such as the LP drum 36, an intermediate pressure economizer, an intermediate pressure drum, or an intermediate pressure evaporator, among other suitable sources or combinations of sources. In addition, while the first heat transfer assembly 60 transfers heat from the cooling tower fluid (e.g., water) 48 to the heating fluid in the illustrated embodiment, in other embodiments, the first heat transfer assembly 60 may be configured to transfer heat from other suitable sources to the heating fluid 58 (e.g., alone or in combination with the cooling tower fluid), such as generator cooling fluid or fluid from an oil cooling system, among other suitable sources or combinations of sources.

Figure 2:
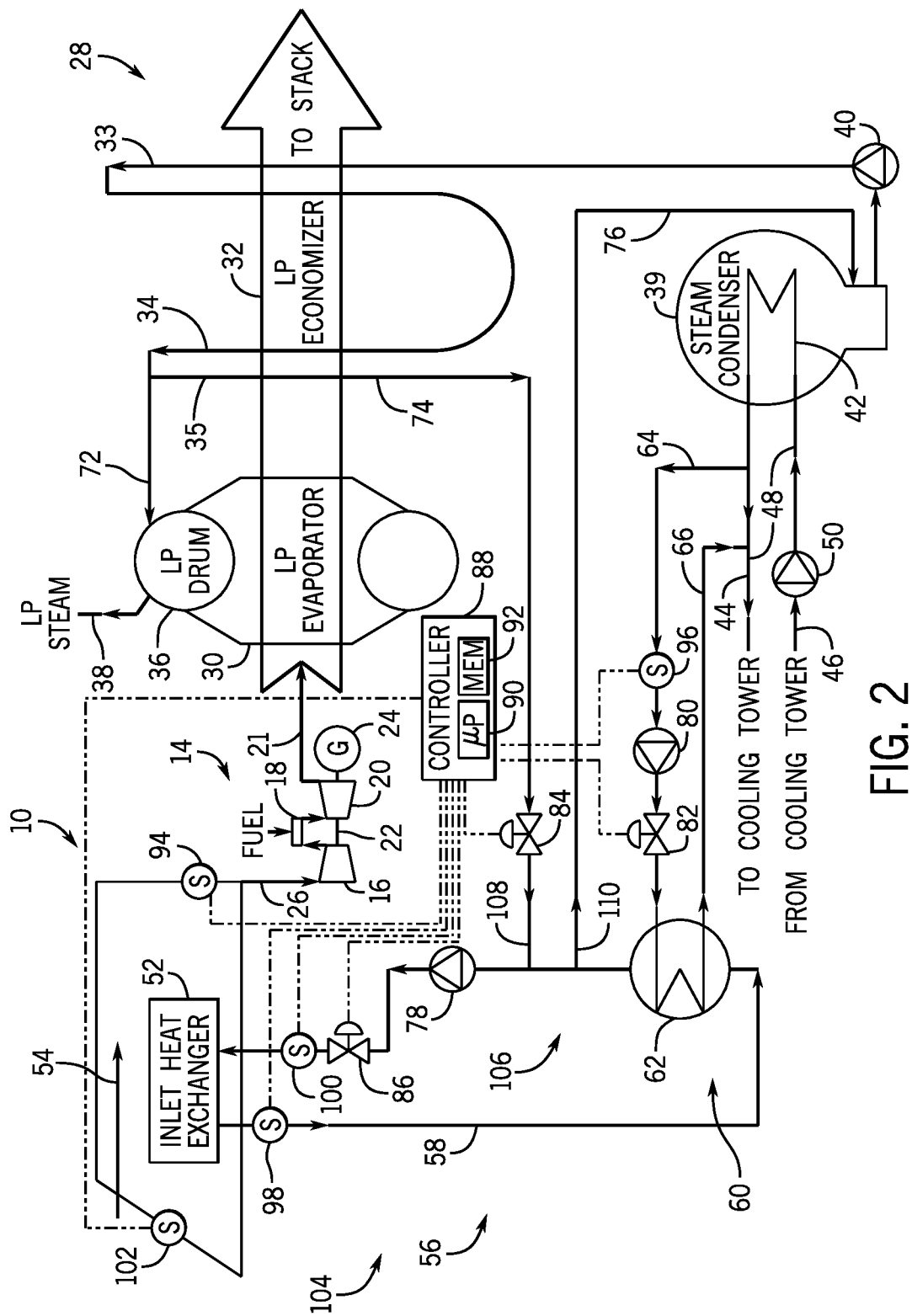
FIG. 2 is a block diagram of the gas turbine system of FIG. 1 having another embodiment of an inlet air heating system, in accordance with an aspect of the present disclosure.

FIG. 2 is a block diagram of the gas turbine system 10 of FIG. 1 having another embodiment of an inlet air heating system 104. In the illustrated embodiment, the inlet air heating system 104 includes the inlet heat exchanger 52, which is positioned upstream of the compressor 16 along the airflow path 54 from the ambient environment to the compressor 16. As previously discussed, the inlet heat exchanger 52 is configured to receive the ambient air and to transfer heat to the air, thereby establishing a heated airflow 26 into the compressor 16. In addition, the inlet air heating system 104 includes the heating loop 56 fluidly coupled to the inlet heat exchanger 52. The heating loop 56 is configured to provide heating fluid 58 to the inlet heat exchanger 52, and the inlet heat exchanger 52 is configured to facilitate transfer of heat from the heating fluid 58 to the airflow into the compressor 16. Furthermore, the inlet air heating system 104 includes the first heat transfer assembly 60 having the heating loop heat exchanger 62. As previously discussed, a portion of the heated cooling tower fluid (e.g., water) 48 flows from the steam condenser 39 to the heating loop heat exchanger 62 via the first fluid passage 64. Within the heating loop heat exchanger 62, heat is transferred from the heated cooling tower fluid 48 to the heating fluid 58, thereby increasing the temperature of the heating fluid 58 and reducing the temperature of the cooling tower fluid 48.

In the illustrated embodiment, the inlet air heating system 104 includes a second heat transfer assembly 106 configured to receive the higher-temperature feed water 35 (e.g., condensate) from the LP economizer 32. The second heat transfer assembly 106 is configured to facilitate heat transfer from the higher-temperature feed water 35 to the heating fluid 58 within the heating loop 56. For example, in certain operating conditions and/or environmental conditions, the first heat transfer assembly 60 may not provide sufficient heat to the heating fluid 58. Accordingly, the second heat transfer assembly 106 may be utilized (e.g., in conjunction with the first heat transfer assembly 60) to provide sufficient heat to the heating fluid to effectively heat the airflow to the compressor 16.

In the illustrated embodiment, the second heat transfer assembly 106 includes a fluid inlet passage 108 and a fluid outlet passage 110. As illustrated, the fluid inlet passage 108 and the fluid outlet passage 110 are fluidly coupled to the heating loop 56. In addition, the fluid inlet passage 108 is fluidly coupled to the second LP flow passage 74, and the fluid outlet passage 110 is fluidly coupled to the third LP flow passage 76. Accordingly, the second LP flow passage 74 and the fluid inlet passage 108 are configured to transfer the higher-temperature feed water 35 (e.g., condensate) from the LP economizer 32 into the heating fluid 58 within the heating loop 56. In addition, the fluid outlet passage 110 and the third LP flow passage 76 are configured to receive the higher-temperature feed water 35 from the heating fluid 58 (e.g., a combination of the higher-temperature feed water 35 and the heating fluid 58) and to transfer the fluid to the steam condenser 39. Within the second heat transfer assembly 106, the higher-temperature feed water 35 mixes with the heating fluid 58, thereby transferring heat from the higher-temperature feed water 35 to the heating fluid 58. As a result, the temperature of the heating fluid 58 within the heating loop increases.

Because the inlet heat exchanger 52 is positioned downstream from the fluid inlet passage 108 and upstream of the fluid outlet passage 110 along the heating loop 56, the higher-temperature heating fluid 58 flows through the inlet heat exchanger 52 before flowing out of the fluid outlet passage 110 toward the steam condenser. While the fluid outlet passage 110 is positioned downstream from the first heat transfer assembly 60 in the illustrated embodiment, in other embodiments, the fluid outlet passage may be positioned upstream of the first heat transfer assembly 60 and downstream of the inlet heat exchanger 52. Because the higher-temperature feed water 35 mixes with the heating fluid 58 within the heating loop 56, water may be used as both the feed water and the heating fluid. Accordingly, the illustrated second heat transfer assembly 106 may be used within gas turbine systems that operate in warmer environments (e.g., in which the possibility of freezing is low).

In the illustrated embodiment, the second valve 84 is configured to control the flow rate of the higher-temperature feed water 35 (e.g., condensate) through the second heat transfer assembly 106. In addition, as previously discussed, the first valve 82, the second valve 84, and the third valve 86 are communicatively coupled to the controller 88. The controller 88 may control the valves in the manner disclosed above with reference to FIG. 1.

Figure 3:
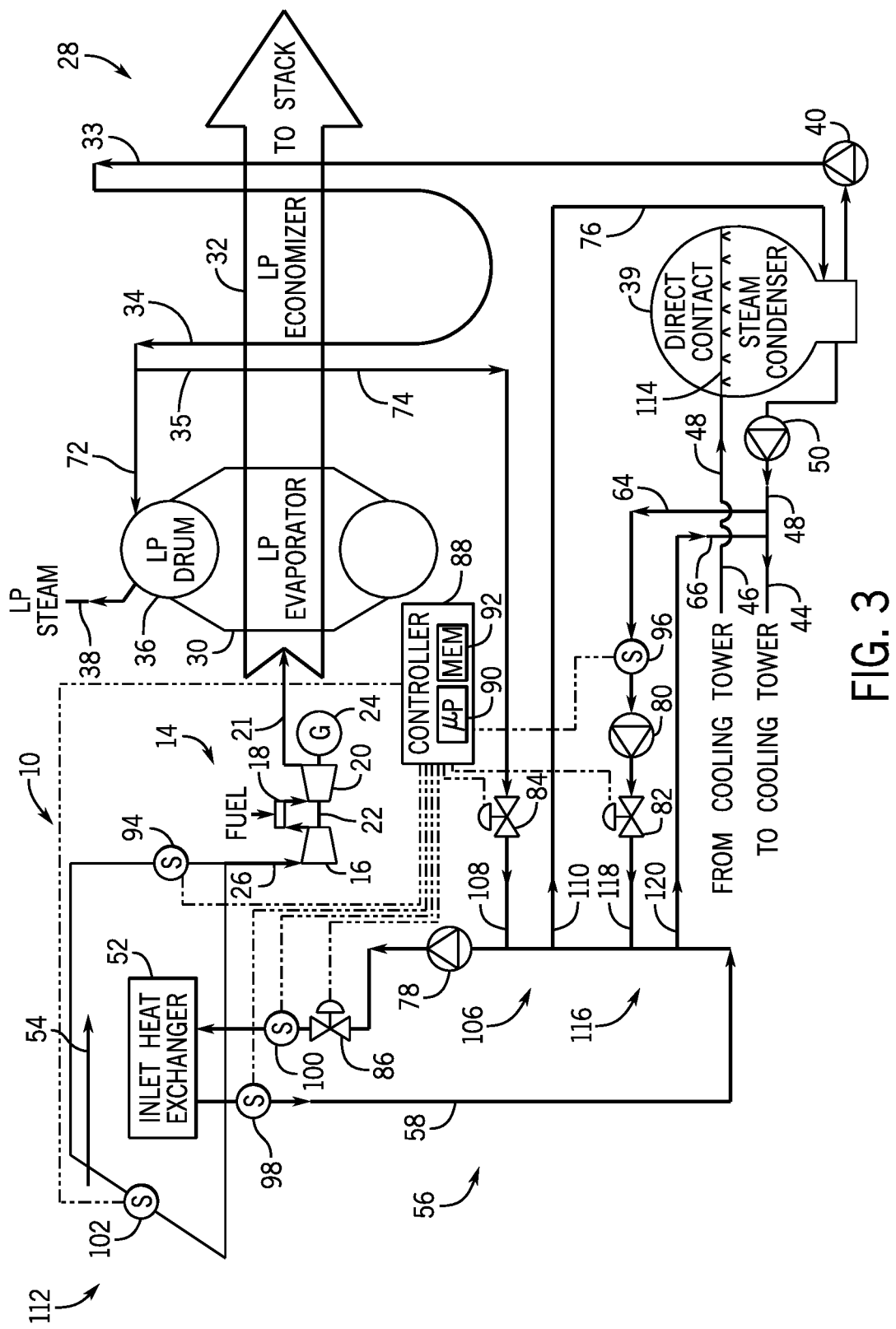
FIG. 3 is a block diagram of the gas turbine system of FIG. 1 having a further embodiment of an inlet air heating system, in accordance with an aspect of the present disclosure.

FIG. 3 is a block diagram of the gas turbine system 10 of FIG. 1 having a further embodiment of an inlet air heating system 112. In the illustrated embodiment, the steam condenser 39 includes a direct contact system 114 configured to mix the cooling tower fluid 48, which is water in the illustrated embodiment, with the received steam/higher-temperature water, thereby generating the lower-temperature feed water 33. Because the received steam/higher-temperature water is mixed with the lower-temperature cooling tower water, the temperature of the lower-temperature feed water 33 is less than the temperature of the received steam/higher-temperature water. In certain embodiments, the direct contact system 114 sprays the cooling tower water into the received steam/higher-temperature water, thereby generating the lower-temperature feed water 33. As previously discussed, the pump 40 drives the lower-temperature feed water to flow from the steam condenser 39 to the LP economizer 32. Because the received steam/higher-temperature water mixes with the cooling tower water, the cooling tower includes a substantially sealed heat exchanger to substantially maintain the purity of the water used within the steam turbine system 28. For example, the cooling tower may include a heat exchanger that facilitates transfer of heat from the cooling tower water to the ambient air.

In the illustrated embodiment, a pump 50 disposed along the first fluid pathway 44 drives the cooling tower water to flow from the steam condenser 39 to the cooling tower. Within the cooling tower, the temperature of the cooling tower water is reduced. The lower-temperature cooling tower water then flows back to the steam condenser 39 via the second fluid pathway 46. While the pump is disposed along the first fluid pathway 44 in the illustrated embodiment, in other embodiments, a pump may be disposed along the second fluid pathway (e.g., alone or in combination with the pump 50 disposed along the first fluid pathway), or the pump 50 may be omitted.

Furthermore, in the illustrated embodiment, the inlet air heating system 112 includes the inlet heat exchanger 52, which is positioned upstream of the compressor 16 along the airflow path 54 from the ambient environment to the compressor 16. As previously discussed, the inlet heat exchanger 52 is configured to receive the ambient air and to transfer heat to the air, thereby establishing a heated airflow 26 into the compressor 16. In addition, the inlet air heating system 112 includes the heating loop 56 fluidly coupled to the inlet heat exchanger 52. The heating loop 56 is configured to provide heating fluid 58 to the inlet heat exchanger 52, and the inlet heat exchanger 52 is configured to facilitate transfer of heat from the heating fluid 58 to the airflow into the compressor 16.

In the illustrated embodiment, the inlet air heating system 112 includes a first heat transfer assembly 116 configured to receive the heated cooling tower water from the steam condenser 39. The first heat transfer assembly 116 is configured to facilitate heat transfer from the heated cooling tower water 48 to the heating fluid 58 within the heating loop 56. In the illustrated embodiment, the first heat transfer assembly 116 includes a fluid inlet passage 118 and a fluid outlet passage 120. As illustrated, the fluid inlet passage 118 and the fluid outlet passage 120 are fluidly coupled to the heating loop 56. In addition, the fluid inlet passage 118 is fluidly coupled to the first fluid passage 64, and the fluid outlet passage 120 is fluidly coupled to the second fluid passage 66. Accordingly, the first fluid passage 64 and the fluid inlet passage 118 are configured to transfer the heated cooling tower water from the first fluid pathway 44 into the heating fluid 58 within the heating loop 56. In addition, the fluid outlet passage 120 and the second fluid passage 66 are configured to receive the cooling tower water from the heating fluid 58 (e.g., a combination of the cooling tower water and the heating fluid 58) and to transfer the fluid to the first fluid pathway 44, which directs the fluid to the cooling tower.

Within the first heat transfer assembly 116, the higher-temperature cooling tower water mixes with the heating fluid 58, thereby transferring heat from the higher-temperature cooling tower water to the heating fluid 58. As a result, the temperature of the heating fluid 58 within the heating loop increases. Because the inlet heat exchanger 52 is positioned downstream from the fluid inlet passage 118 and upstream of the fluid outlet passage 120 along the heating loop 56, the higher-temperature heating fluid 58 flows through the inlet heat exchanger 52 before flowing out of the fluid outlet passage 120 toward the first fluid pathway 44. Because the heated cooling tower water mixes with the heating fluid 58 within the heating loop 56, water may be used as both the cooling tower fluid and the heating fluid. Accordingly, the illustrated first heat transfer assembly 116 may be used within gas turbine systems that operate in warmer environments (e.g., in which the possibility of freezing is low).

Furthermore, in the illustrated embodiment, the inlet air heating system 112 includes the second heat transfer assembly 106 configured to receive the higher-temperature feed water 35 (e.g., condensate) from the LP economizer 32. As previously discussed, the second heat transfer assembly 106 is configured to facilitate heat transfer from the higher-temperature feed water 35 to the heating fluid 58 within the heating loop 56. For example, in certain operating conditions and/or environmental conditions, the first heat transfer assembly 116 may not provide sufficient heat to the heating fluid 58. Accordingly, the second heat transfer assembly 106 may be utilized (e.g., in conjunction with the first heat transfer assembly 116) to provide sufficient heat to the heating fluid to effectively heat the airflow to the compressor 16.

In the illustrated embodiment, the higher-temperature feed water 35 mixes with the heating fluid 58 within the second heat transfer assembly 106, thereby transferring heat from the higher-temperature feed water 35 to the heating fluid 58. As a result, the temperature of the heating fluid 58 within the heating loop increases. While the higher-temperature feed water 35 mixes with the heating fluid 58 within the second heat transfer assembly 106 in the illustrated embodiment, in other embodiments, the second heat transfer assembly 106 may include a second heating loop heat exchanger, as disclosed above with reference to FIG. 1, which is configured to facilitate transfer of heat from the higher-temperature feed water to the heating fluid 58 without mixing the fluids.

In the illustrated embodiment, the first valve 82 is configured to control the flow rate of the cooling tower water through the first heat transfer assembly 116. In addition, as previously discussed, the first valve 82, the second valve 84, and the third valve 86 are communicatively coupled to the controller 88. The controller 88 may control the valves in the manner disclosed above with reference to FIG. 1.

Figure 4:
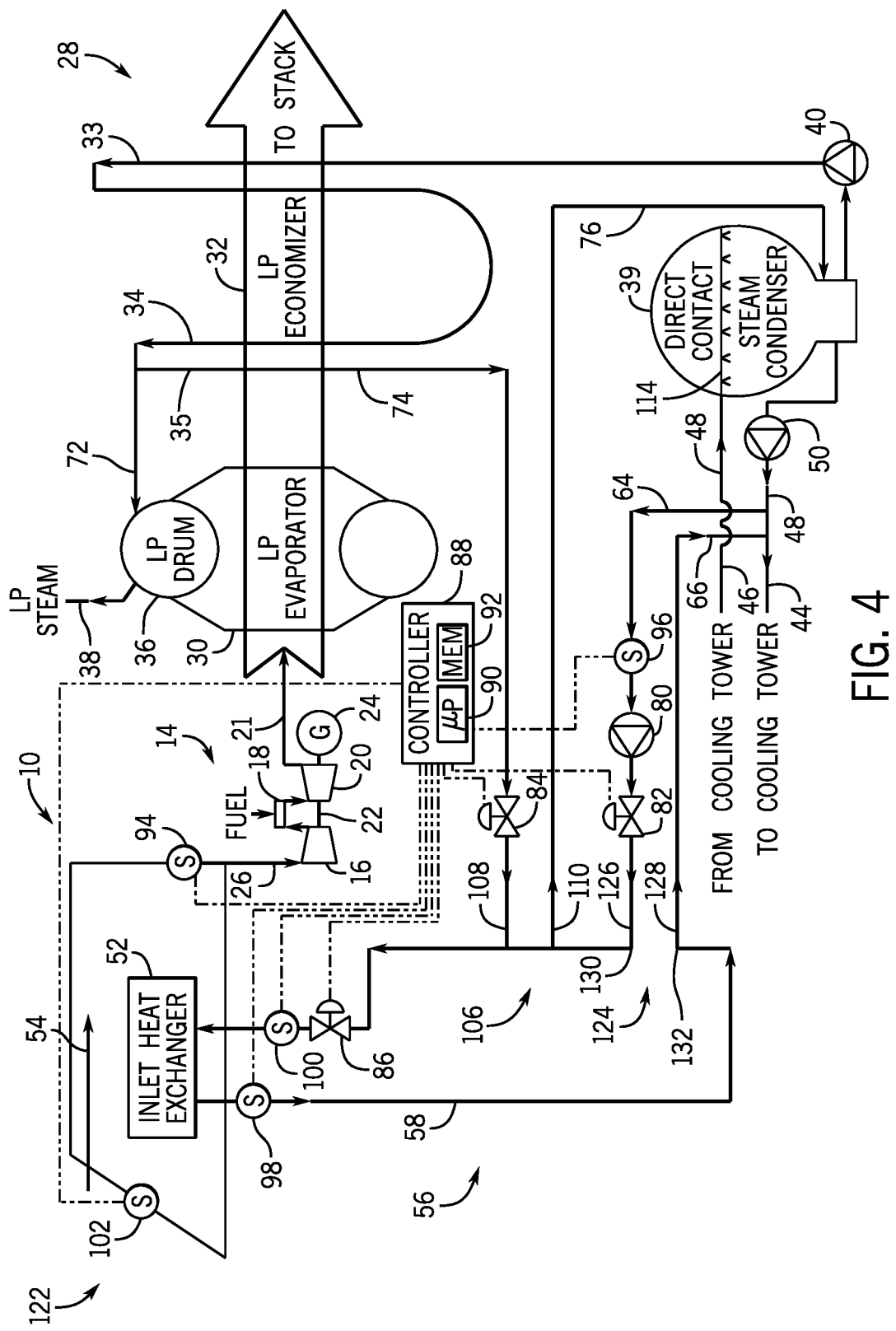
FIG. 4 is a block diagram of the gas turbine system of FIG. 1 having another embodiment of an inlet air heating system, in accordance with an aspect of the present disclosure.

FIG. 4 is a block diagram of the gas turbine system 10 of FIG. 1 having another embodiment of an inlet air heating system 122. In the illustrated embodiment, the steam condenser 39 includes the direct contact system 114 configured to mix the cooling tower fluid 48, which is water in the illustrated embodiment, with the received steam/higher-temperature water, thereby generating the lower-temperature feed water 33, as previously discussed above with reference to FIG. 3.

Furthermore, in the illustrated embodiment, the inlet air heating system 122 includes the inlet heat exchanger 52, which is positioned upstream of the compressor 16 along the airflow path 54 from the ambient environment to the compressor 16. As previously discussed, the inlet heat exchanger 52 is configured to receive the ambient air and to transfer heat to the air, thereby establishing a heated airflow 26 into the compressor 16. In addition, the inlet air heating system 122 includes the heating loop 56 fluidly coupled to the inlet heat exchanger 52. The heating loop 56 is configured to provide heating fluid 58 to the inlet heat exchanger 52, and the inlet heat exchanger 52 is configured to facilitate transfer of heat from the heating fluid 58 to the airflow into the compressor 16.

In the illustrated embodiment, the inlet air heating system 122 includes a first heat transfer assembly 124 configured to receive the heated cooling tower water from the steam condenser 39. The first heat transfer assembly 124 is configured to facilitate heat transfer from the heated cooling tower water to the heating fluid 58 within the heating loop 56. In the illustrated embodiment, the first heat transfer assembly 124 includes a fluid inlet passage 126 and a fluid outlet passage 128. As illustrated, the fluid inlet passage 126 and the fluid outlet passage 128 are fluidly coupled to the heating loop 56. In addition, the fluid inlet passage 126 is fluidly coupled to the first fluid passage 64, and the fluid outlet passage 128 is fluidly coupled to the second fluid passage 66.

In the illustrated embodiment, the heating loop 56 has an inlet 130 and an outlet 132. The inlet 130 of the heating loop 56 is fluidly coupled to the fluid inlet passage 126 of the first heat transfer assembly 124, and the outlet 132 of the heating loop 56 is fluidly coupled to the fluid outlet passage 128. Accordingly, the first fluid passage 64 and the fluid inlet passage 126 are configured to transfer the heated cooling tower water from the first fluid pathway 44 into the heating loop 56 via the heating loop inlet 130. The cooling tower water flows through the heating loop 56 from the inlet 130 to the outlet 132. As such, the heating fluid 58 and the cooling tower water are the same fluid. However, the fluid is referred to as heating fluid while the fluid is within the heating loop. Therefore, the first fluid passage 64 and the fluid inlet passage 126 are configured to transfer the heated cooling tower water from the first fluid pathway 44 into the heating fluid 58 within the heating loop 56, thereby facilitating heat transfer from the heated cooling tower water to the heating fluid 58. In addition, the fluid outlet passage 128 and the second fluid passage 66 are configured to receive the cooling tower water from the heating fluid 58 at the outlet 132 of the heating loop 56 and to transfer the cooling tower water to the first fluid pathway 44, which directs the cooling tower water to the cooling tower.

At the first heat transfer assembly 124, the higher-temperature cooling tower water flows into the heating loop 56 as heating fluid 58. Because the inlet heat exchanger 52 is positioned downstream from the fluid inlet passage 126 and upstream of the fluid outlet passage 128 along the heating loop 56, the heating fluid 58 flows through the inlet heat exchanger 52 before flowing out of the fluid outlet passage 128 toward the first fluid pathway 44. Because the cooling tower water and the heating fluid are the same fluid in the illustrated embodiment, water may be used as both the cooling tower fluid and the heating fluid. Accordingly, the illustrated first heat transfer assembly 124 may be used within gas turbine systems that operate in warmer environments (e.g., in which the possibility of freezing is low).

Furthermore, in the illustrated embodiment, the inlet air heating system 122 includes the second heat transfer assembly 106 configured to receive the higher-temperature feed water 35 (e.g., condensate) from the LP economizer 32. As previously discussed, the second heat transfer assembly 106 is configured to facilitate heat transfer from the higher-temperature feed water 35 to the heating fluid 58 within the heating loop 56. For example, in certain operating conditions and/or environmental conditions, the first heat transfer assembly 124 may not provide sufficient heat to the heating fluid 58. Accordingly, the second heat transfer assembly 106 may be utilized (e.g., in conjunction with the first heat transfer assembly 124) to provide sufficient heat to the heating fluid 58 to effectively heat the airflow to the compressor 16.

In the illustrated embodiment, the higher-temperature feed water 35 mixes with the heating fluid 58 within the second heat transfer assembly 106, thereby transferring heat from the higher-temperature feed water 35 to the heating fluid 58. As a result, the temperature of the heating fluid 58 within the heating loop 56 increases. While the higher-temperature feed water 35 mixes with the heating fluid 58 within the second heat transfer assembly 106 in the illustrated embodiment, in other embodiments, the second heat transfer assembly 106 may include a second heating loop heat exchanger, as disclosed above with reference to FIG. 1, which is configured to facilitate transfer of heat from the higher-temperature feed water to the heating fluid 58 without mixing the fluids.

In the illustrated embodiment, the first valve 82 is configured to control the flow rate of the cooling tower water through the first heat transfer assembly 124. In addition, as previously discussed, the first valve 82, the second valve 84, and the third valve 86 are communicatively coupled to the controller 88. The controller 88 may control the valves in the manner disclosed above with reference to FIG. 1.

Because the cooling tower water flows through the heating loop 56 from the inlet 130 to the outlet 132, the heat transfer assembly pump 80 may establish a sufficient flow of fluid through the heating loop 56. As a result, in certain embodiments, the heating loop pump (e.g., 78, shown in FIG. 3) may be omitted. Furthermore, while the second heat transfer assembly 106 is configured to mix the higher-temperature feed water 35 with the heating fluid 58 in the embodiments disclosed above with reference to FIGS. 2-4, in other embodiments, the second heat transfer assembly 106 may transfer the higher-temperature feed water 35 into the heating loop as heating fluid 58. The second heat transfer assembly 106 may also receive the heating fluid 58 from the heating loop 56 and direct the fluid toward the steam condenser 39 as feed water.

In addition, while each inlet air heating system includes a second heat transfer assembly in the embodiments disclosed above with reference to FIGS. 1-4, in certain embodiments, the second heat transfer assembly may be omitted. Furthermore, any of the variations within the gas turbine system, including the inlet air heating system, disclosed above with reference to the embodiment of FIG. 1 may apply to the gas turbine system disclosed above with reference to the embodiments of FIGS. 2-4.

While each of the embodiments of the inlet air heating system disclosed above with reference to FIGS. 1-4 includes a single inlet heat exchanger, in other embodiments, the inlet air heating system may include multiple inlet heat exchangers (e.g., positioned along the airflow path to the compressor). For example, a first inlet heat exchanger may be fluidly coupled to a first heating loop, and the first heat transfer assembly (e.g., the first heat transfer assembly of any of the embodiments disclosed above) may be disposed along the first heating loop. In addition, a second inlet heat exchanger may be fluidly coupled to a second heating loop, and the second heat transfer assembly (e.g., the second heat transfer assembly of any of the embodiments disclosed above) may be disposed along the second heating loop.

Furthermore, in certain embodiments, the inlet air heating system may include a single inlet heat exchanger having two independent coils. For example, a first coil may be fluidly coupled to a first heating loop, and the first heat transfer assembly (e.g., the first heat transfer assembly of any of the embodiments disclosed above) may be disposed along the first heating loop. In addition, a second coil may be fluid coupled to a second heating loop, and the second heat transfer assembly (e.g., the second heat transfer assembly of any of the embodiments disclosed above) may be disposed along the second heating loop.

Furthermore, in certain embodiments, the third LP flow passage may fluidly couple the second heat transfer assembly to the first LP flow passage. In such embodiments, a pump may be disposed along the third LP flow passage to drive the feed water from the second heat transfer assembly to the first LP flow passage. Accordingly, the higher-temperature feed water may flow from the first LP flow passage to the second heat transfer assembly via the second LP flow passage, and then the feed water may flow from the second heat transfer assembly back to the first LP flow passage via the third LP flow passage (e.g., at a location downstream from the intersection of the first LP flow passage and the second LP flow passage).

This written description uses examples to disclose the subject matter, including the best mode, and also to enable any person skilled in the art to practice the disclosed subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An inlet air heating system for a gas turbine system, comprising:
   an inlet heat exchanger configured to be positioned upstream of a compressor of the gas turbine system;
   a heating loop fluidly coupled to the inlet heat exchanger, wherein the heating loop is configured to provide heating fluid to the inlet heat exchanger, and the inlet heat exchanger is configured to facilitate transfer of heat from the heating fluid to an airflow into the compressor;
   a first heat transfer assembly configured to receive cooling tower fluid from a fluid pathway extending between a steam condenser and a cooling tower, wherein the first heat transfer assembly is configured to facilitate transfer of heat from the cooling tower fluid to the heating fluid; and
   a second heat transfer assembly configured to receive heated fluid from a steam turbine system, wherein the second heat transfer assembly is configured to facilitate transfer of heat from the heated fluid to the heating fluid;
   wherein the second heat transfer assembly is positioned downstream from the first heat transfer assembly along a fluid flow path extending through the heating loop from the first heat transfer assembly to an inlet of the inlet heat exchanger.

2. The inlet air heating system of claim 1, wherein the first heat transfer assembly comprises a heating loop heat exchanger configured to facilitate transfer of the heat from the cooling tower fluid to the heating fluid.

3. The inlet air heating system of claim 1, wherein the first heat transfer assembly comprises a fluid inlet passage and a fluid outlet passage, the fluid inlet passage and the fluid outlet passage are fluidly coupled to the heating loop, the fluid inlet passage is configured to transfer the cooling tower fluid from the fluid pathway into the heating fluid, and the fluid outlet passage is configured to receive the cooling tower fluid from the heating fluid and to transfer the cooling tower fluid to the fluid pathway.

4. The inlet air heating system of claim 1, comprising a controller comprising a memory and a processor, wherein the controller is configured to control one or more valves to control a first flow rate of the cooling tower fluid through the first heat transfer assembly, a second flow rate of the heated fluid through the second heat transfer assembly, a third flow rate of the heating fluid through the heating loop, or a combination thereof.

5. The inlet air heating system of claim 1, wherein the second heat transfer assembly comprises a second heating loop heat exchanger configured to facilitate transfer of the heat from the heated fluid to the heating fluid.

6. The inlet air heating system of claim 1, wherein the second heat transfer assembly comprises a second fluid inlet passage and a second fluid outlet passage, the second fluid inlet passage and the second fluid outlet passage are fluidly coupled to the heating loop, the second fluid inlet passage is configured to transfer the heated fluid from the steam turbine system into the heating fluid, and the second fluid outlet passage is configured to receive the heated fluid from the heating fluid and to transfer the heated fluid to the steam condenser.

7. The inlet air heating system of claim 1, comprising a heating loop pump configured to circulate the heating fluid within the heating loop, a heat transfer assembly pump configured to drive the cooling tower fluid to the first heat transfer assembly, or a combination thereof.

8. An inlet air heating system for a gas turbine system, comprising:
   an inlet heat exchanger configured to be positioned upstream of a compressor of the gas turbine system;
   a heating loop fluidly coupled to the inlet heat exchanger, wherein the heating loop is configured to provide heating fluid to the inlet heat exchanger, and the inlet heat exchanger is configured to facilitate transfer of heat from the heating fluid to an airflow into the compressor;
   a first heat transfer assembly configured to receive cooling tower fluid from a fluid pathway extending between a steam condenser and a cooling tower, wherein the first heat transfer assembly is configured to facilitate transfer of heat from the cooling tower fluid to the heating fluid;
   a second heat transfer assembly configured to receive heated fluid from a steam turbine system, wherein the second heat transfer assembly is configured to facilitate transfer of heat from the heated fluid to the heating fluid;
   a first valve configured to control a first flow rate of the cooling tower fluid through the first heat transfer assembly;
   a second valve configured to control a second flow rate of the heated fluid through the second heat transfer assembly;
   a third valve configured to control a third flow rate of the heating fluid through the heating loop; and
   a controller comprising a memory and a processor, wherein the controller is communicatively coupled to the first valve, to the second valve, and to the third valve, and the controller is configured to control the first valve, the second valve, and the third valve.

9. The inlet air heating system of claim 8, wherein the controller is configured to control the first valve to establish a target temperature of the airflow into the compressor.

10. The inlet air heating system of claim 8, wherein the controller is configured to enable opening of the second valve in response to determining that a position of the first valve is greater than or equal to a threshold position for more than a first threshold duration, and the controller is configured to instruct the second valve to close and to disable opening of the second valve in response to determining that the position of the first valve is less than the threshold position for more than a second threshold duration.

11. The inlet air heating system of claim 10, wherein the controller is configured to control the second valve to establish a target temperature of the airflow into the compressor while opening of the second valve is enabled.

12. The inlet air heating system of claim 10, wherein the controller is configured to instruct the first valve to close while opening of the second valve is enabled and in response to determining that a temperature difference between the cooling tower fluid flowing into the first heat transfer assembly and the heating fluid flowing from the inlet heat exchanger is less than or equal to a threshold temperature difference for more than a third threshold duration.

13. The inlet air heating system of claim 8, wherein the controller is configured to control the third valve such that a first temperature difference is less than a second temperature difference multiplied by a first adjustment factor and greater than or equal to the second temperature difference multiplied by a second adjustment factor, wherein the first adjustment factor is greater than the second adjustment factor, the first temperature difference corresponds to a difference between a temperature of the heating fluid flowing into the inlet heat exchanger and a temperature of the heating fluid flowing out of the inlet heat exchanger, and the second temperature difference corresponds to a difference between a target temperature of the airflow into the compressor and a temperature of a second airflow into the inlet heat exchanger.

14. An inlet air heating system for a gas turbine system, comprising:
   an inlet heat exchanger configured to be positioned upstream of a compressor of the gas turbine system;
   a heating loop fluidly coupled to the inlet heat exchanger, wherein the heating loop is configured to provide heating fluid to the inlet heat exchanger, and the inlet heat exchanger is configured to facilitate transfer of heat from the heating fluid to an airflow into the compressor;
   a first heat transfer assembly configured to receive cooling tower fluid from a fluid pathway extending between a steam condenser and a cooling tower, wherein the first heat transfer assembly is configured to facilitate transfer of heat from the cooling tower fluid to the heating fluid; and
   a second heat transfer assembly configured to receive condensate from a low pressure economizer, wherein the second heat transfer assembly is configured to facilitate transfer of heat from the condensate to the heating fluid;
   wherein the second heat transfer assembly is positioned downstream from the first heat transfer assembly along a fluid flow path extending through the heating loop from the first heat transfer assembly to an inlet of the inlet heat exchanger.

15. The inlet air heating system of claim 14, wherein the first heat transfer assembly comprises a heating loop heat exchanger configured to facilitate transfer of the heat from the cooling tower fluid to the heating fluid.

16. The inlet air heating system of claim 14, wherein the first heat transfer assembly comprises a fluid inlet passage and a fluid outlet passage, the fluid inlet passage and the fluid outlet passage are fluidly coupled to the heating loop, the fluid inlet passage is configured to transfer the cooling tower fluid from the fluid pathway into the heating fluid, and the fluid outlet passage is configured to receive the cooling tower fluid from the heating fluid and to transfer the cooling tower fluid to the fluid pathway.

17. The inlet air heating system of claim 14, wherein the second heat transfer assembly comprises a second heating loop heat exchanger configured to facilitate transfer of the heat from the condensate to the heating fluid.

18. The inlet air heating system of claim 14, wherein the second heat transfer assembly comprises a second fluid inlet passage and a second fluid outlet passage, the second fluid inlet passage and the second fluid outlet passage are fluidly coupled to the heating loop, the second fluid inlet passage is configured to transfer the condensate from the low pressure economizer into the heating fluid, and the second fluid outlet passage is configured to receive the condensate from the heating fluid and to transfer the condensate to the steam condenser.

19. The inlet air heating system of claim 14, comprising:
   a first valve configured to control a first flow rate of the cooling tower fluid through the first heat transfer assembly;
   a second valve configured to control a second flow rate of the condensate through the second heat transfer assembly; and
   a third valve configured to control a third flow rate of the heating fluid through the heating loop.

20. The inlet air heating system of claim 19, comprising a controller comprising a memory and a processor, wherein the controller is communicatively coupled to the first valve, to the second valve, and to the third valve, and the controller is configured to control the first valve, the second valve, and the third valve.

* * * * *